United States Patent [19]
Muramatsu

[11] Patent Number: 5,502,720
[45] Date of Patent: Mar. 26, 1996

[54] PACKET COLLECTING CIRCUIT IN DATA-FLOW TYPE SYSTEM

[75] Inventor: Tsuyoshi Muramatsu, Kashiwa, Japan

[73] Assignee: Sharp Kabushiki Kaisha, Osaka, Japan

[21] Appl. No.: 956,094

[22] Filed: Oct. 2, 1992

[30] Foreign Application Priority Data

Oct. 3, 1991 [JP] Japan ................... 3-283757

[51] Int. Cl.⁶ .................................................. H04J 3/02
[52] U.S. Cl. ................................... 370/60; 370/112
[58] Field of Search .................... 370/112, 41, 42, 370/43, 44, 45, 46, 91, 58.1, 58.2, 58.3, 84, 85.9, 85.11; 328/104, 154, 117, 119, 138, 60, 61, 62, 63; 307/243, 269; 340/825.03, 825.06, 825.14, 825.2, 825.21, 825.57

[56] References Cited

U.S. PATENT DOCUMENTS

| | | | |
|---|---|---|---|
| 3,952,253 | 4/1976 | DeVolpi et al. | 328/61 |
| 4,035,580 | 7/1977 | Dieter et al. | 370/91 |
| 4,099,029 | 7/1978 | Maruta et al. | 370/91 |
| 4,214,213 | 7/1980 | Ferrie | 328/154 |
| 4,255,760 | 3/1981 | Ferrie | 328/154 |
| 4,758,738 | 7/1988 | Yamanoi et al. | 328/63 |
| 4,797,574 | 1/1989 | Okubo et al. | 328/63 |
| 5,046,064 | 9/1991 | Suzuki et al. | 370/60 |
| 5,153,578 | 10/1992 | Izawa et al. | 370/96.2 |
| 5,157,286 | 10/1992 | Butler et al. | 328/63 |
| 5,200,647 | 4/1993 | Motoike | 370/112 |

FOREIGN PATENT DOCUMENTS 3233740  10/1991  Japan .

OTHER PUBLICATIONS

"An Implementation Method Of A Large-Scale Storage Mechanism For The Data Driven Processor", Kanekura, 1989, FIGS. 1-3 and 6.

*Primary Examiner*—Melvin Marcelo
*Assistant Examiner*—Huy D. Vu

[57] ABSTRACT

A plurality of self-synchronous type transfer control circuits and data hold circuits are provided corresponding to a plurality of flow paths. A transfer control circuit for controlling flag transfer and a flag holding circuit for holding a flag are provided. A decoder applies a transfer acknowledging signal for permission of transfer to one of the plurality of transfer control circuits according to a flag held by the flag holding circuit. A data selector outputs data provided from a data holding circuit to a data holding circuit in a succeeding stage according to the flag held by the flag holding circuit.

22 Claims, 10 Drawing Sheets

PACKET COLLECTING CIRCUIT IN DATA-FLOW TYPE SYSTEM

BACKGROUND OF THE INVENTION

1. Field of the Invention

The present invention relates generally to packet collecting circuits, and more particularly, to packet collecting circuits for use in data-flow type system.

2. Description of the Background Art

In a data-flow type system, data flows in synchronization with pulse signals transmitted through the system and corresponding processing is carried out on the data which is subsequently shifted. FIG. 8 is a block diagram showing a structure of a data transmission path for transmitting data in the data-flow type system.

The data transmission path includes a self-synchronous type transfer control circuit 1 and a data hold circuit 2 comprised of a D type flip-flop. The transfer control circuit 1 has a pulse input terminal CI for receiving a pulse from a preceding stage portion (not shown), a transfer acknowledging (permitting) output terminal RO for outputting a transfer acknowledging (permitting) signal indicative of permission or inhibition of transfer to the preceding stage portion, a pulse output terminal CO for outputting a pulse to a succeeding stage portion (not shown) and a transfer acknowledging input terminal RI for receiving a transfer acknowledging signal indicative of permission or inhibition of transfer from the succeeding stage portion. The transfer control circuit 1, on receiving a pulse from the preceding stage portion, outputs pulses to the succeeding stage portion and to the data hold circuit 2 when a transfer acknowledging signal from the succeeding stage portion is in a permitted state. The data hold circuit 2 holds data DI applied from the preceding stage portion and applies the held data to the succeeding stage portion as output data DO in response to the pulse applied from the transfer control circuit 1.

In the data-flow type system, data and pulses are sequentially transferred through a plurality of data transmission paths of the structure shown in FIG. 9 connected in series.

An interleave processing system is adopted for such a relatively time consuming single processing as memory access. The interleave processing system employs a packet distributing circuit 3 and a packet collecting circuit 4 as shown in FIG. 9. The packet distributing circuit 3 distributes pulses and data packets applied to an input terminal 1 among a plurality of processing circuits 5. The packet collecting circuit 4 collects pulses and data packets applied from the plurality of processing circuits 5 and outputs the same to an output terminal 0 in a predetermined order. The packet collecting circuit 4 includes a plurality of merging circuits.

FIG. 10 is a block diagram showing a structure of one merging circuit included in the packet collecting circuit 4. The merging circuit includes a pulse control circuit 41 and a data selector 42.

The pulse control circuit 41 has first and second pulse input terminals CIa and CIb for receiving two asynchronous input pulses, a pulse output terminal CO for outputting pulses and a selector SEL for outputting a select signal. The data selector 42 has first and second data input terminals DIa and DIb for receiving two asynchronous data packets, a data output terminal DO for outputting data packets and a selector terminal SEL for receiving a select signal.

On receiving two asynchronous input pulses at the first and the second pulse input terminals CIa and CIb, the pulse control circuit 41 outputs a select signal indicative of a value corresponding to the first received pulse through the selector terminal SEL and outputs a pulse through the pulse output terminal CO at the same time. The data selector 42 outputs one of the data packets applied to the first and second data input terminals DIa and DIb through the data output terminal DO in response to the select signal.

After the lapse of a predetermined time, the pulse control circuit 41 outputs a select signal indicative of a value corresponding to the second received pulse through the selector terminal SEL and at the same time outputs a pulse to the pulse output terminal CO. The data selector 42 outputs the other of the data packets applied to the first and the second data input terminals DIa and DIb through the data output terminal DO in response to the select signal.

As described in the foregoing, the pulse control circuit 41 controls the data selector 42 such that the data packets are transferred in the order of arrival.

The merging circuit of FIG. 10 collects data packets flowing through a first packet flow path constituted by the first pulse input terminal CIa and the first data input terminal DIa and data packets flowing through a second packet flow path constituted by the second pulse input terminal CIb and the second data input terminal DIb, which data packets are output to a packet flow path constituted by the pulse output terminal CO and the data output terminal DO.

The packet collecting circuit 4 of FIG. 9 constituted by the merging circuit of FIG. 10 produces an effect that data packets flowing through a plurality of packet flow paths are equally merged.

However, for collecting data packets flowing through eight packet flow paths, for example, seven merging circuits are required. A circuit scale is extremely increased.

In addition, while data packets flowing through a plurality of packet flow paths are merged equally, it is not possible to control the order of data packet trains output from a packet collecting circuit. It is therefore impossible to keep the order of data packet trains output from a packet collecting circuit. It is therefore impossible to keep the order of data packets to be applied to the input terminal of the packet distributing circuit 3 shown in FIG. 9.

SUMMARY OF THE INVENTION

An object of the present invention is to provide a packet collecting circuit capable of controlling the order of output packet trains and a method of operating the circuit.

Another object of the present invention is to provide a packet collecting circuit of an extremely simple structure capable of controlling the order of output packet trains.

A packet collecting circuit according to the present invention includes a plurality of packet transfer circuits, a flag transfer circuit and a selection circuit. The plurality of packet transfer circuits are provided each for a respective one of the plurality of flow paths to transfer or send a packet applied from a corresponding flow path to a flow path in a succeeding stage. The flag transfer circuit transfers a flag for designating one of the plurality of flow paths. The selection circuit selects one of the plurality of packet transfer circuits and permits the selected packet transfer circuit to transfer a packet according to the flag transferred by the flag transfer circuit.

The flag transfer circuit may include a self-synchronous type flag transfer control circuit and a flag hold circuit. The flag transfer control circuit generates a pulse signal for flag transfer and a transfer acknowledging signal indicative of permission and inhibition of transfer in response to a transfer acknowledging signal indicative of permission and inhibition of transfer and a pulse signal from a preceding stage. The flag hold circuit holds and outputs a flag applied from the preceding stage in response to the pulse signal from the flag transfer control circuit.

Each of the plurality of packet transfer circuits may include a self-synchronous type first transfer control circuit and a first packet hold circuit. The first transfer control circuit generates a pulse signal for packet transfer and a transfer acknowledging signal indicative of permission and inhibition of transfer in response to a transfer acknowledging signal indicative of permission and inhibition of transfer and a pulse signal from a preceding stage. The first packet hold circuit holds and outputs a packet applied from a corresponding flow path in response to the pulse signal from the first transfer control circuit.

A flow path in a succeeding stage may include a self-synchronous type second transfer control circuit and a second packet hold circuit. The second transfer control circuit generates a pulse signal for packet transfer and a transfer acknowledging signal indicative of permission and inhibition of transfer in response to a transfer acknowledging signal indicative of permission and inhibition of transfer and a pulse signal from a preceding stage. The second packet hold circuit holds and outputs a packet applied from one of the plurality of first packet hold circuits in response to the pulse signal from the second transfer control circuit.

The flag hold circuit has a reset function and may be reset in response to a transfer acknowledging signal from the second transfer control circuit.

In the packet collecting circuit, operation of the contents of a flag can designate a flow path from which a packet is to be transferred to a flow path in a succeeding stage. It is therefore possible to arbitrarily control the order of outputs of collected packet trains. In addition, a packet collecting circuit having such a function can be realized in an extremely simple structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only, and thus are not limitative of the present invention, and wherein.

DESCRIPTION OF THE PREFERRED EMBODIMENTS

Figure 1:
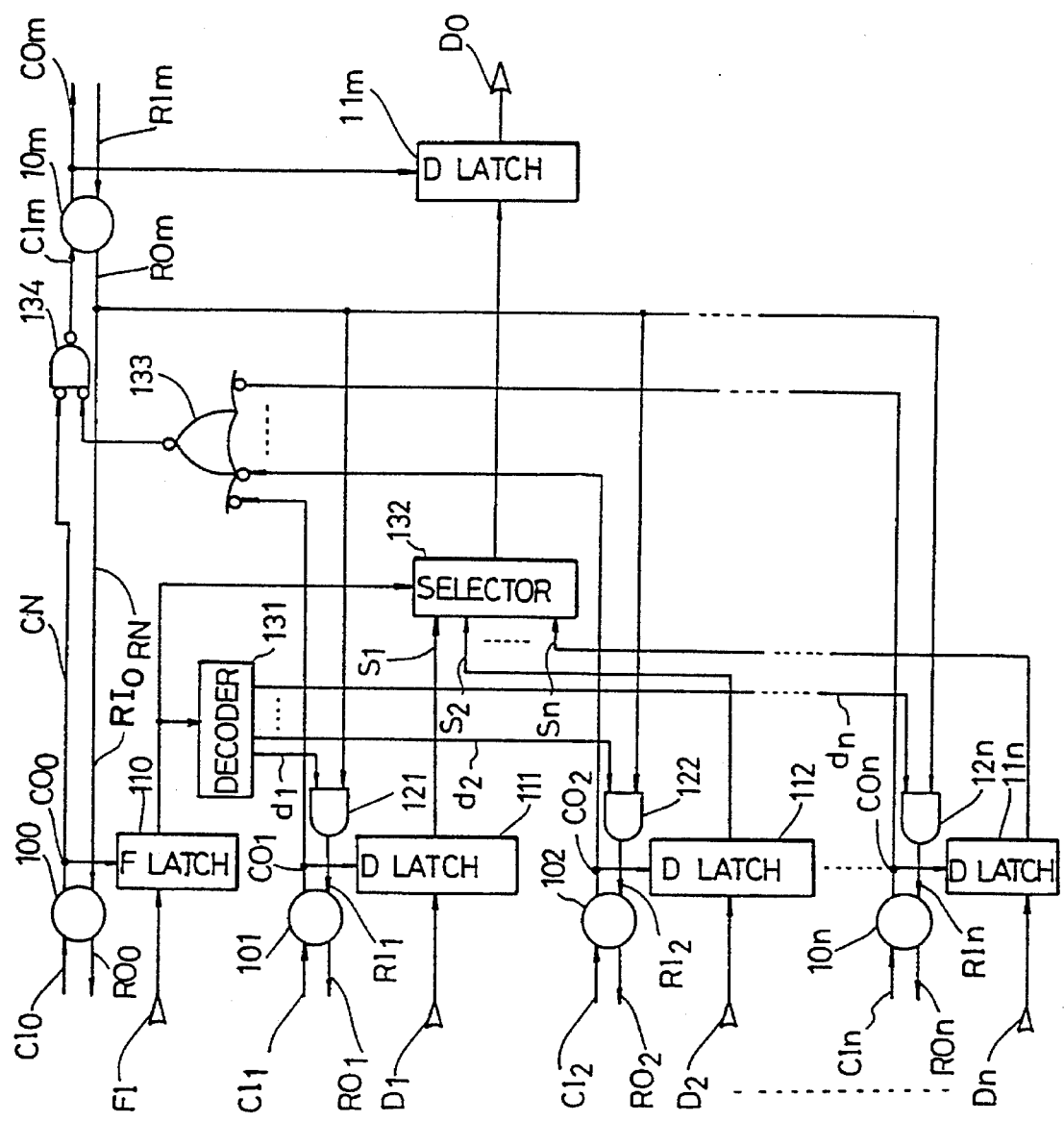
FIG. 1 is a block diagram showing a structure of a packet collecting circuit according to one embodiment of the present invention.

A packet collecting circuit according to one embodiment of the present invention collects data packets from n packet flow paths as shown in FIG. 1. The packet collecting circuit includes self-synchronous type transfer control circuits (hereinafter referred to as transfer control circuits) $100$, $101-10n$ and $10m$, data hold circuits $110$, $111-11n$ and $11m$, gates $121-12n$, $133$ and $134$, a decoder $131$ and a data selector $132$.

An input terminal FI receives a flag indicative of a source of collection. Data input terminals D1–Dn are supplied with respective data portions of data packets flowing through first to n-th flow paths. Hereinafter, the data hold circuit $110$ is referred to as an F latch and the data hold circuits $111-11n$ as D latches. The gates $121-12n$ will be referred to as permission gates. The gate $133$ is referred to as a collection gate, while the gate $134$ is referred to as a transfer gate.

Pulse input terminals $CI_0-CI_n$ and transfer acknowledging output terminals $RO_0-RO_n$ of the transfer control circuit $100_n$ are connected to the transfer control circuits (not shown) in the preceding stage. Pulse output terminals $CO_0-CO_n$ of the transfer control circuits $100-10n$ are connected to the corresponding latches $110-11n$. The pulse output terminal $CO_0$ of the transfer control circuit $100$ is also connected to one input terminal of the transfer gate $134$ through a node CN. The output terminals $CO_1-CO_n$ of the transfer control circuits $101-10n$ are also connected to the input terminals of the collection gate $133$. The output terminal of the collection gate $133$ is connected to the other input terminal of the transfer gate $134$. The output terminal of the transfer gate $134$ is connected to a pulse input terminal CIm of the transfer control circuit $10m$. A transfer acknowledging output terminal ROm of the transfer control circuit $10m$ is connected to a transfer acknowledging input terminal $RI_0$ of the transfer control circuit $100$ through a node RN.

A flag applied to the flag input terminal FI is supplied to the F latch $110$. The F latch $110$ latches and outputs the flag to the decoder $131$ and the data selector $132$. Each of output terminals $d_1-d_n$ of the decoder $131$ is connected to one input terminal of each of the permission gates $121-12n$. The decoder $131$ brings one of signals of the output terminals $d_1-d_n$ up to "1" according to the flag applied from the F latch $110$.

The other input terminal of each of the permission gates $121-12n$ is connected to the transfer acknowledging output terminal ROm of the transfer control circuit 10m. The output terminals of the permission gates 121–12n are respectively connected to transfer acknowledging input terminals $RI_1$–$RI_n$ of the transfer control circuits 101–10n.

The D latches 111–11n latch data of the first to n-th flow paths to be applied to the data input terminals $D_1$–$D_n$ and output the data to input terminals $S_1$–$S_n$ of the data selector 132. The data selector 132 selects one of the data applied to the input terminals $S_1$–$S_n$ according to a flag applied from the F latch 110 and outputs the selected data to the D latch 11m.

A pulse output terminal COm and a transfer acknowledging input terminal RIm of the transfer control circuit 10m is connected to a transfer control circuit (not shown) in a succeeding stage. The pulse output terminal COm of the transfer control circuit 10m is also connected to the D latch 11m. The D latch 11m latches the data applied from the data selector 132 and outputs the same to a data output terminal $D_0$.

Figure 2:
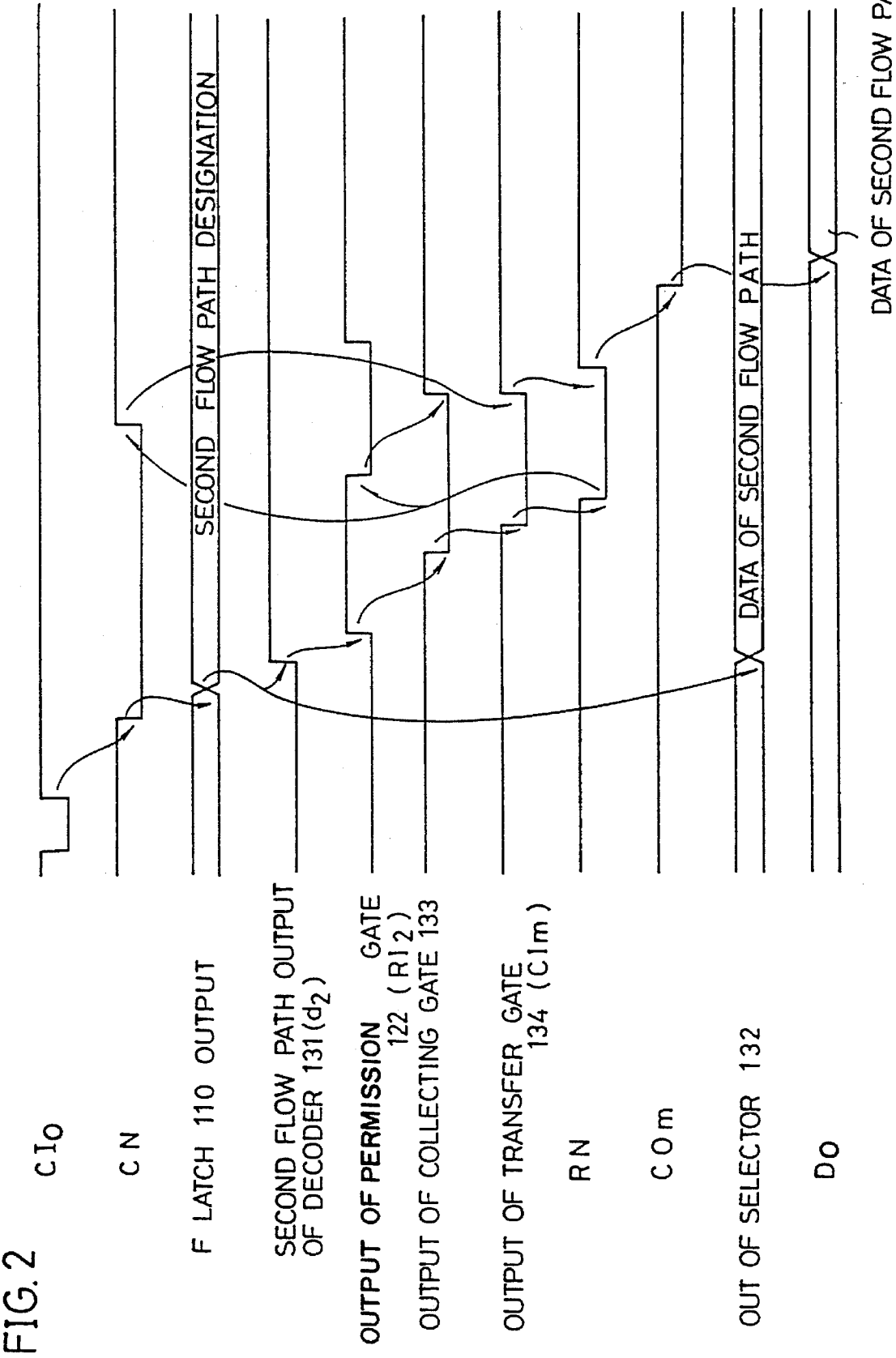
FIG. 2 is a timing chart illustrating an operation of the packet collecting circuit of FIG. 1.

Operation of the packet collecting circuit of FIG. 1 will be described with reference to the timing chart of FIG. 2.

First, a negative pulse (transfer request) is applied to the pulse input terminal $CI_0$, while a flag is applied to the flag input terminal FI. The flag indicates a flow path of data to be transferred. As a result, the transfer control circuit 100 brings a potential of the node CN down to "0". The F latch 110 latches the flag of the flag input terminal FI and outputs the flag to the decoder 131 and the data selector 132 in response to a fall of the potential of the node CN.

At this time point, the potential "0" of the node CN is not propagated to the transfer control circuit 10m by the transfer gate 134. The decoder 131 brings one of the signals of the output terminals $d_1$–$d_n$ to "1" (transfer permitted state) in response to a flag.

It is assumed herein that data of the second flow path is to be transferred. In this case, the decoder 131 brings the signal of the output terminal $d_2$ to "1" (transfer permitted state). As a result, the permission gate 122 applies a transfer acknowledging signal (transfer permitted state) of "1" to the transfer control circuit 102 when a transfer acknowledging signal applied from the transfer control circuit 10m has "1" (transfer permitted state).

If a negative pulse (transfer request) is already supplied from the transfer control circuit in the preceding stage, the transfer control circuit 102 immediately brings a potential of the pulse output terminal $CO_2$ down to "0" (transfer request). If a negative pulse (transfer request) is not yet applied from the transfer control circuit in the preceding stage, the transfer control circuit 102 brings the potential of the pulse output terminal $CO_2$ down to "0" (transfer request) upon receiving the negative pulse. At the same time, the D latch 112 latches the data of the data input terminal $D_2$ and outputs the data to the data selector 132 in response to the fall of the potential of the pulse output terminal $CO_2$.

The collection gate 133 brings the output signal down to "0" (transfer requested state) in response to the transfer request from the transfer control circuit 102. At this time point, the transfer gate 134 brings the output signal down to "0" (transfer requested state).

As a result, the transfer control circuit 10m brings a transfer acknowledging signal of the node RN down to "0" (transfer inhibited state), whereby the transfer control circuits 100 and 102 assume a transfer inhibited state.

On the other hand, the data selector 132 selects data (data of the second flow path) applied from the D latch 112 and outputs the selected data to the D latch 11m according to a flag applied from the F latch 110. When the transfer control circuit 10m brings the potential of the pulse output terminal COm down to "0", the D latch 11m latches the data applied from the data selector 132 and outputs the same to the data output terminal $D_0$ in response to the fall.

During this time period, the transfer control circuits 101–10n except for the transfer control circuit 102 are disabled from performing a transfer processing because of functions of the permission gates 121–12n irrespective of a reception of a transfer request from a corresponding transfer control circuit in the preceding stage. Data of a flow path designated by a flag is transferred in this manner.

By sequentially applying flags to the flag input terminal FI, data flowing through the first to n-th flow paths are collected in a predetermined order.

Figure 3:
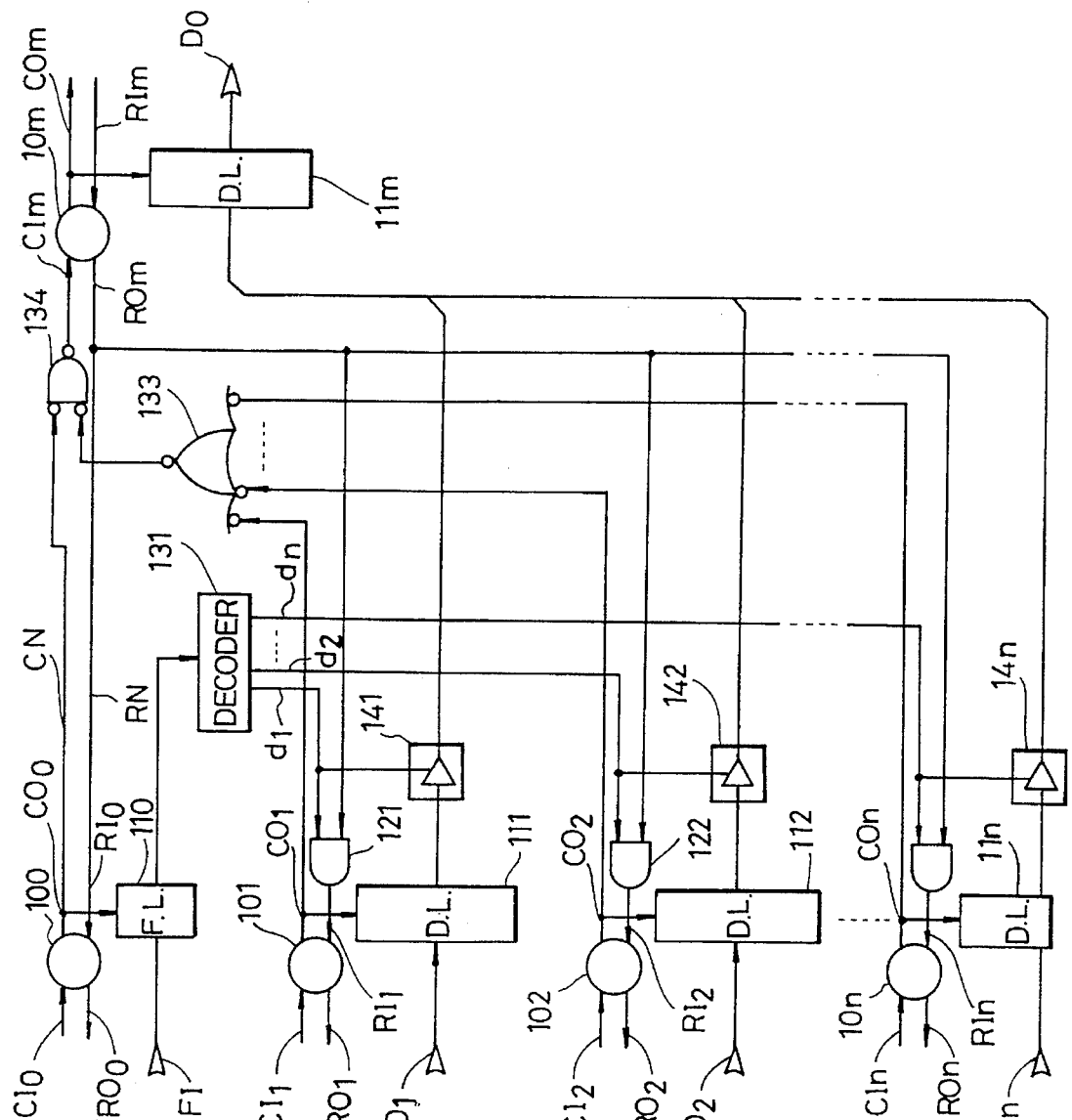
FIG. 3 is a block diagram showing a structure of a packet collecting circuit according to another embodiment of the present invention.

A packet collecting circuit according to another embodiment of the present invention is provided with n 3-state gates 141–14n in place of the data selector 132 as shown in FIG. 3.

The 3-state gates 141–14n are connected between the D latches 111–11n and the D latch 11m, respectively. Control terminals of the 3-state gates 141–14n are connected to the output terminals $d_1$–$d_n$ of the decoder 131, respectively. The other part of the structure is the same as that of FIG. 1.

The decoder 131 brings one of signals of the output terminals $d_1$–$d_n$ to "1" according to a flag applied from the F latch 110. As a result, a corresponding 3-state gate becomes conductive. The remaining 3 state gates assume a high impedance state.

For example, the decoder 131 brings a signal of the output terminal $d_2$ up to "1" according to a flag. As a result, the 3-state gate 142 becomes conductive.

The entire operation of the packet collecting circuit shown in FIG. 3 is the same as that of the packet collecting circuit of FIG. 1. The use of the n 3-state gates 141–14n are employed in place of the data selector 132 to simplify a circuit structure. In addition, it is possible to readily increase the number of flow paths of the sources of collection.

A packet collecting circuit according to a further embodiment of the present invention includes a F latch 110a having a reset function in place of the F latch 110. The other part of the structure is the same as that shown in FIG. 1.

A reset terminal RST of the F latch 110a is connected to the transfer acknowledging input terminal $RI_0$ (node RN) of the transfer control circuit 100.

According to the packet collecting circuit of FIG. 1, when the transfer control circuit 10m starts processing a transfer of a data pocket respective D latch in a succeeding stage after receiving a transfer request from the transfer gate 134, a potential of the node RN is restored to "1" (transfer permitted state). Therefore, the permission gate 122, for example, again permits a transfer to the transfer control circuit 102 at this time point. In the event that a packet stays n the second flow path, or since packets are quite frequently transferred to the second flow path, the transfer control circuit 102 may erroneously start processing of a transfer of a data packet (overrun error).

The packet collecting circuit of FIG. 4 can avoid such erroneous operation, which will be described with reference to the timing chart of FIG. 5. When the potential of the node RN is brought to "1", the F latch 110a is reset. As a result, a value of a flag latched by the F latch 110a is cleared, whereby the F latch 110a outputs a signal designating no flow path in response thereto, all of the permission gates 121–12m inhibit the corresponding transfer control circuits 101–10n from transferring data.

The overrun error is avoided in this manner.

Figure 4:
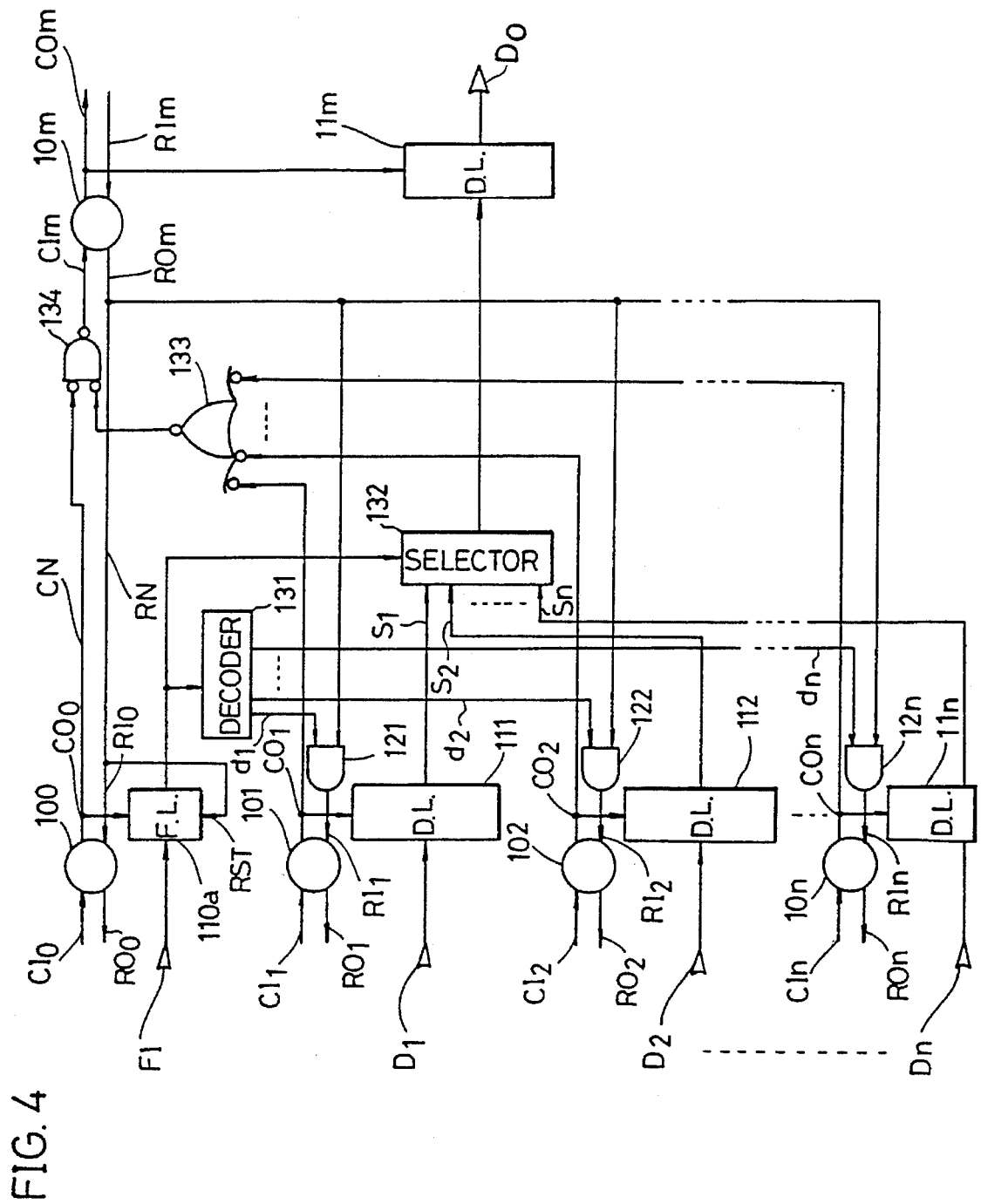
FIG. 4 is a block diagram showing a structure of a packet collecting circuit according to a further embodiment of the present invention.
Figure 5:
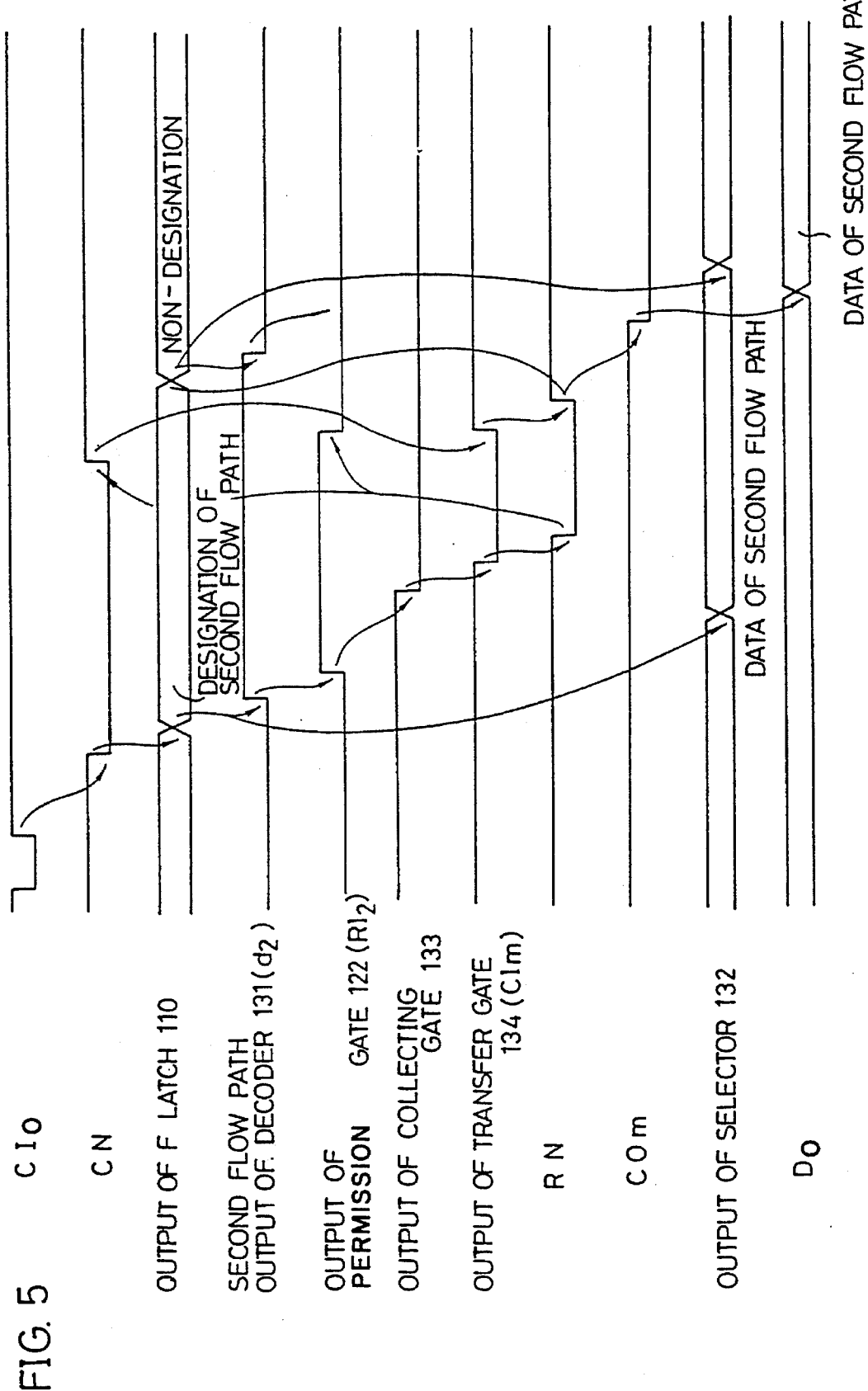
FIG. 5 is a timing chart illustrating an operation of the packet collecting circuit of FIG. 4.
Figure 6:
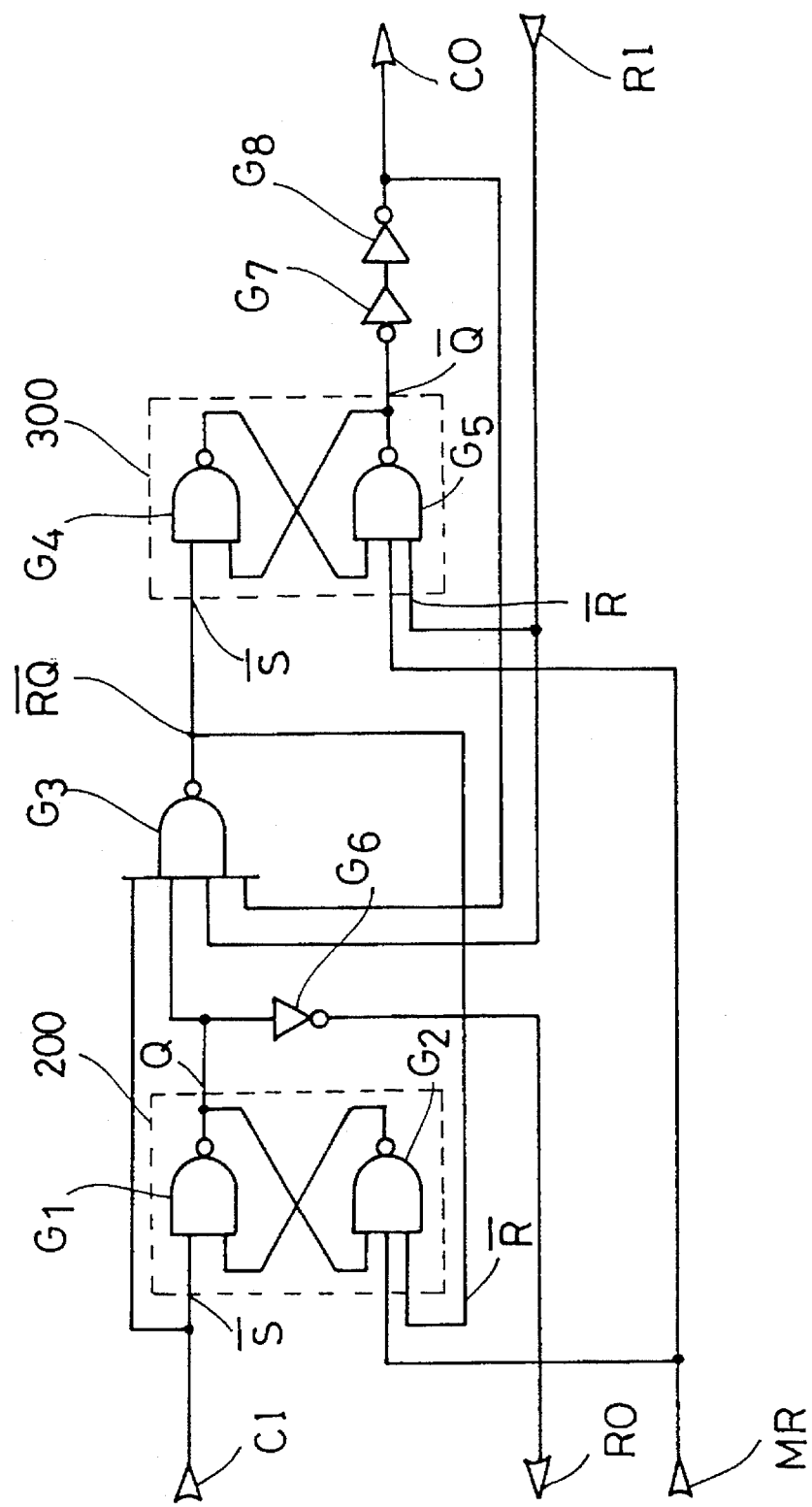
FIG. 6 is a logic circuit diagram showing a structure of a self-synchronous type transfer control circuit for use in the packet collecting circuits of FIGS. 1, 3 and 4.

FIG. 6 is a circuit diagram showing one example of a structure of a self-synchronous type transfer control circuit for use in the packet collecting circuits shown in FIGS. 1, 3 and 4.

The transfer control circuit of FIG. 6 includes NAND gates $G_1$–$G_5$ and inverters $G_6$–$G_8$. The NAND gates $G_1$–$G_2$ and G2 constitute an RS flip-flop 200, while the NAND gates $G_4$ and $G_5$ constitute an RS flip-flop 300.

The 4-input NAND gate $G_3$ has a first input terminal connected to a pulse input terminal CI, a second input terminal connected to a node Q of the RS flip-flop 200, a third input terminal connected to a transfer acknowledging input terminal RI and a node $\overline{R}$ of the RS flip-flop 300, and a fourth input terminal connected to a pulse output terminal CO. An output terminal (node $\overline{RQ}$) of the gate $G_3$ is connected to a node $\overline{S}$ of the RS flip-flop 300. The node $\overline{Q}$ of the RS flip-flop 300 is connected to the pulse output terminal CO through the two inverters $G_7$ and $G_8$.

Figure 7:
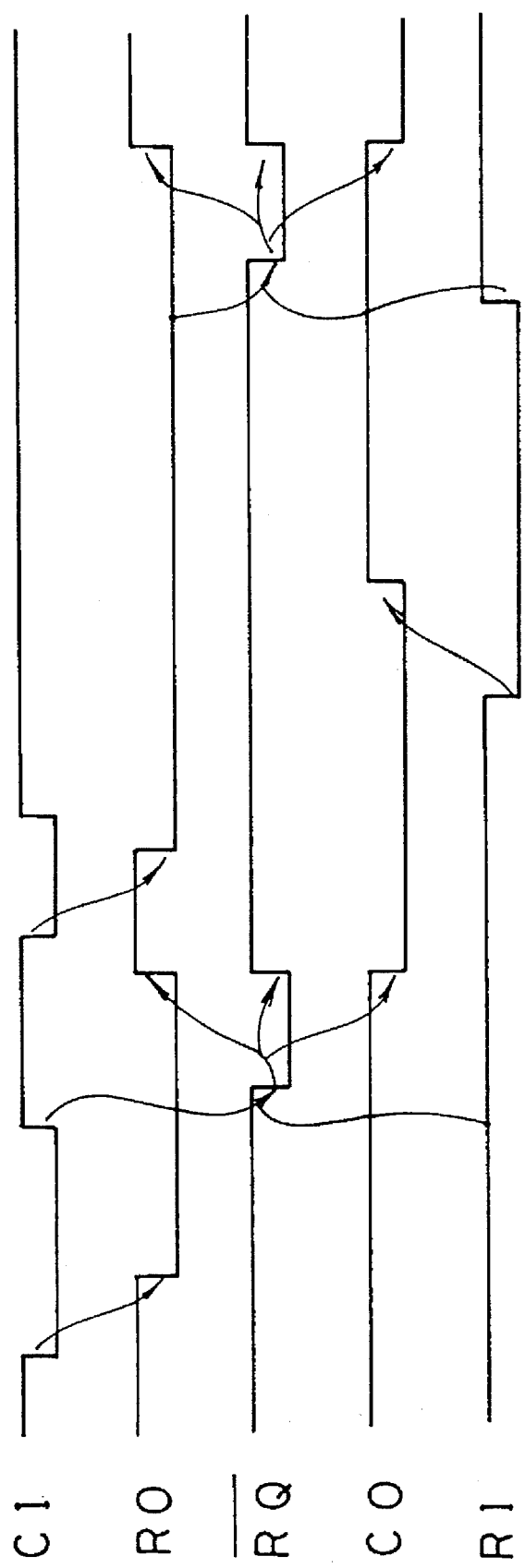
FIG. 7 is a timing chart illustrating an operation of the self-synchronous type transfer control circuit of FIG. 6.
Figure 8:
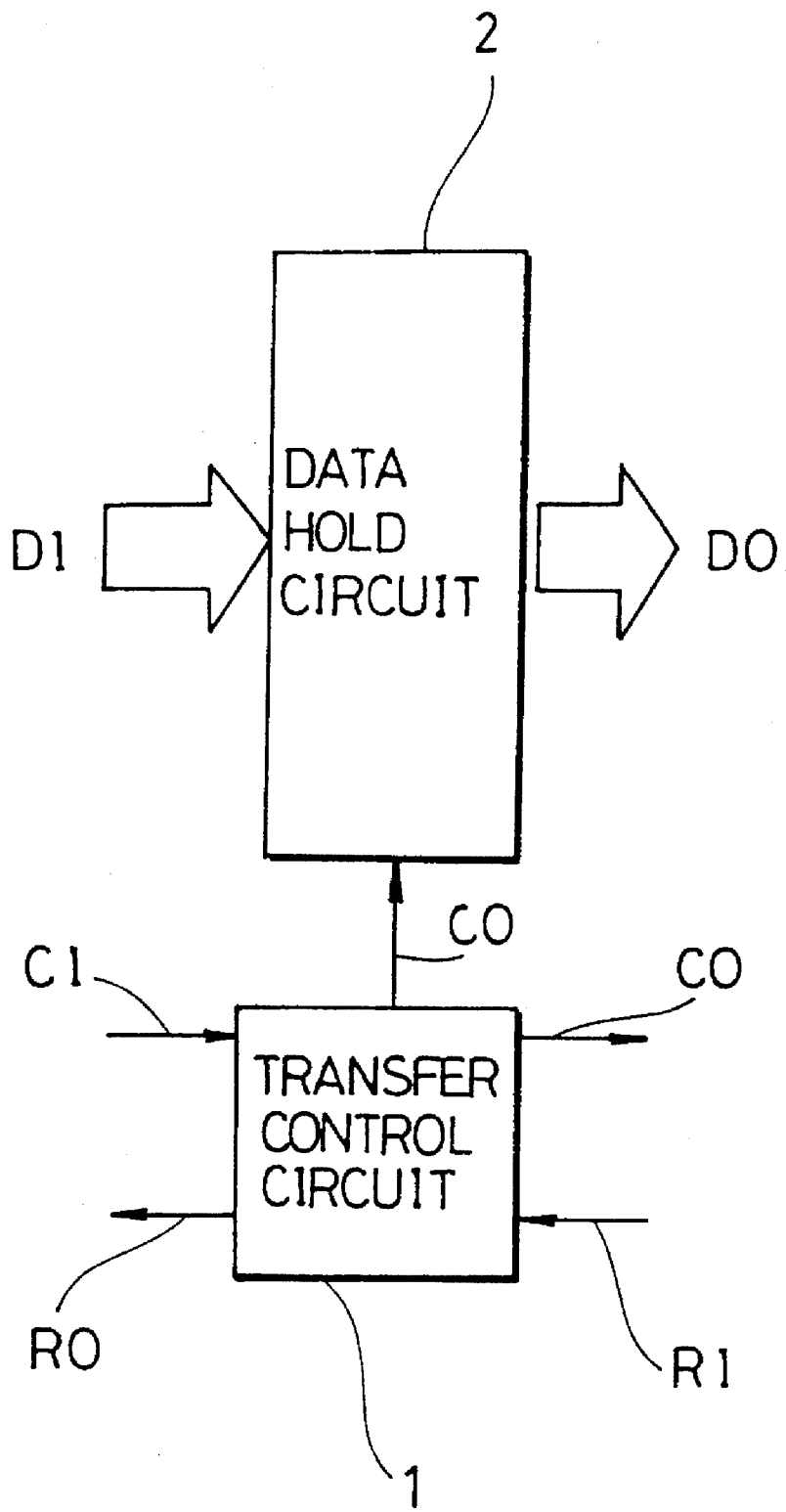
FIG. 8 is a block diagram showing a structure of a data transmission path for use in a data-flow type system.
Figure 9:
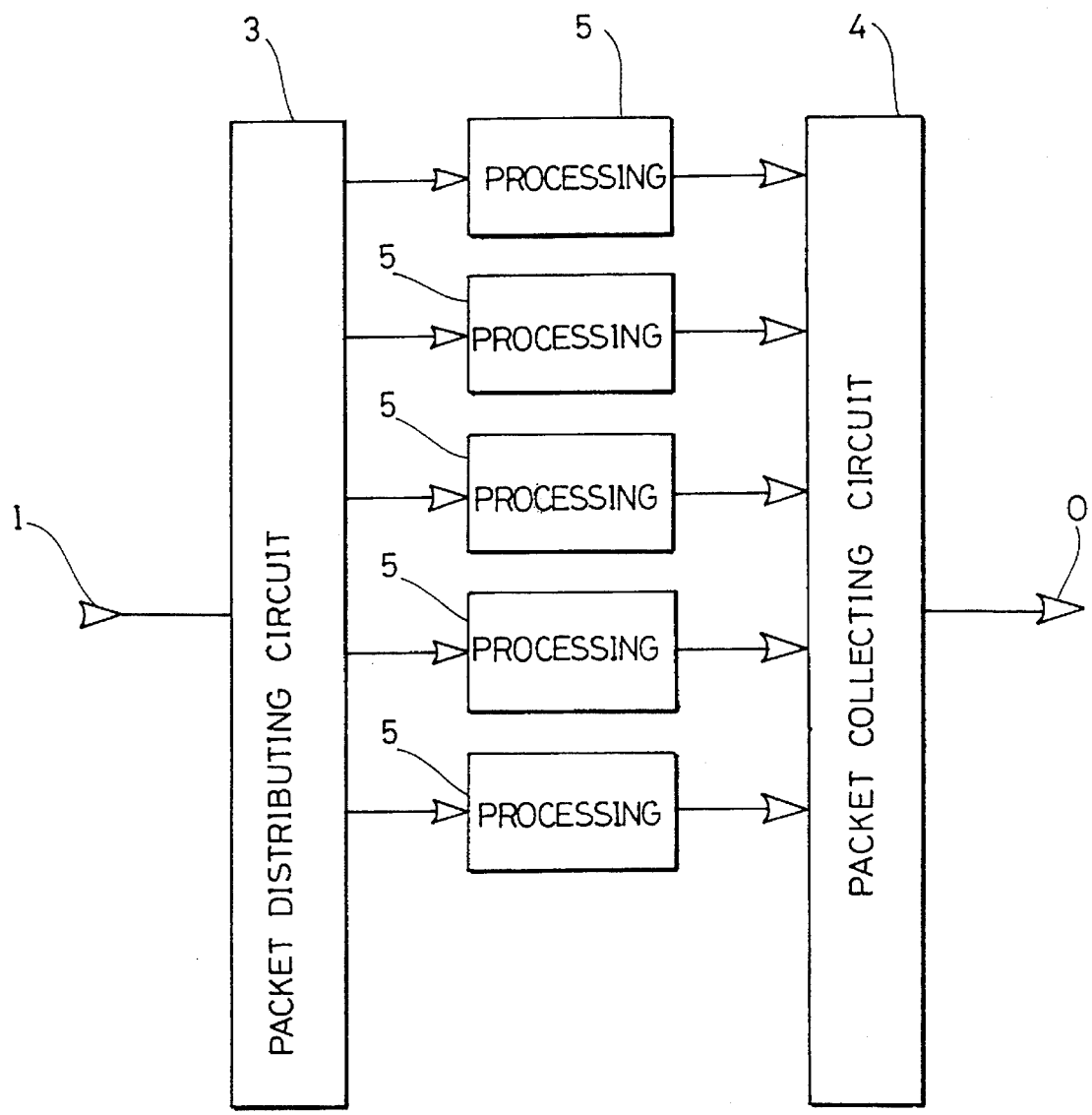
FIG. 9 is a block diagram showing a structure of an interleave system processing apparatus.
Figure 10:
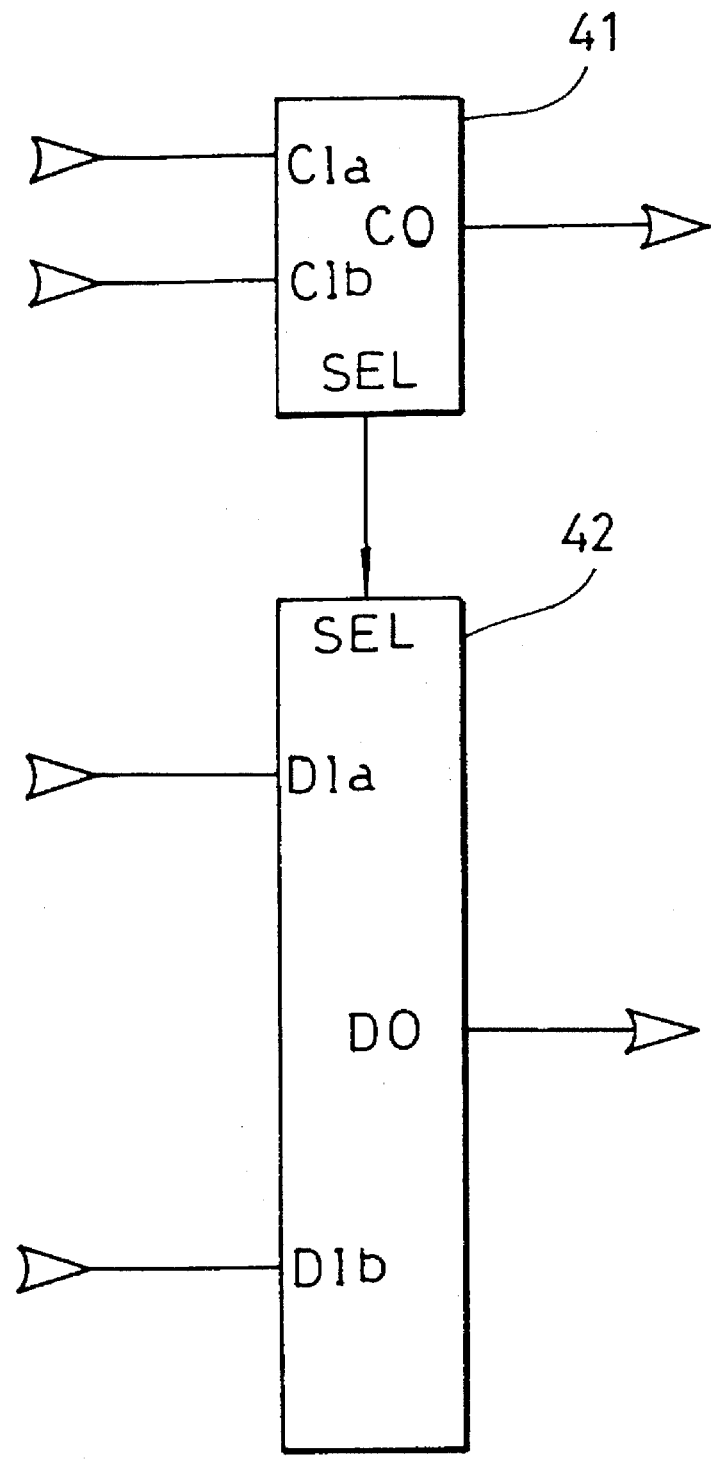
FIG. 10 is a block diagram showing one example of a merging circuit for use in a conventional packet collecting circuit.

Operation of the transfer control circuit shown in FIG. 6 will be described with reference to the timing chart of FIG. 7.

First, when a negative pulse is applied to a master reset input terminal MR, the transfer control circuit of FIG. 6 is initialized. As a result, the pulse output terminal CO, the node $\overline{RQ}$ and a transfer acknowledging output terminal RO output "1".

When a preceding stage portion (not shown) provides a negative pulse to the pulse input terminal CI in response to the transfer acknowledging output terminal RO outputting "1" (permitted state), the RS flip-flop 200 is set in response to a fall of the pulse, whereby an output from the node Q goes "1". As a result, the output from the transfer acknowledging output terminal RO goes "0" (inhibited state or transfer verified state). Thus, the preceding stage portion is informed of a reception of a pulse.

If transfer acknowledging signal applied to the transfer acknowledging input terminal RI is "1" (permitted state) at a rise of a pulse applied to the pulse input terminal CI, the output (a signal of the node $\overline{RS}$) of the gate $G_3$ goes "0". An input to the node $\overline{R}$ of the RQ flip-flop 200 goes "0" and the RS flip-flop 200 is reset. As a result, the output from the node Q of the RS flip-flop 200 goes "0", while the output from the transfer acknowledging output terminal RO goes "1". The output (the signal of the node $\overline{RQ}$) of the gate $G_3$ is restored to "1". At this time point, peripheral circuits of the RS flip-flop 200 are supposed to be initialized.

The foregoing operation causes a negative pulse to be generated at the node $\overline{RQ}$. The RS flip-flop 300 is reset in response to the negative pulse, whereby an output from the node $\overline{Q}$ goes "0". The output of "0" from the node $\overline{Q}$ is provided to the pulse output terminal CO through the inverters $G_7$ and $G_8$. At the same time, the output is fed back to the gate $G_3$. As a result, the gate $G_3$ is locked so as not to output "0" again.

When sensing "0" provided from the pulse output terminal CO, the succeeding stage portion (not shown) applies a negative pulse to the transfer acknowledging input terminal RI. The transfer control circuit is informed that the succeeding stage portion senses "0" provided from the pulse output terminal CO.

The RS flip-flop 300 is reset at a fall of a pulse applied to the transfer acknowledging input terminal RI. As a result, the output from the pulse output terminal CO returns to "1" and the peripheral circuits are initialized, while the lock of the gate $G_3$ is released. A pulse is provided from the pulse output terminal CO in this manner.

The gate $G_3$ remains locked by an input to the transfer acknowledging input terminal R1 until the pulse applied to the transfer acknowledging input terminal R1 rises to "1".

As described in the foregoing, even if the RS flip-flop 200 is again reset by a negative pulse to be applied to the pulse input terminal CI during the above series of operation of the RS flip-flop 300, the gate $G_3$ outputs no negative pulse unless an input to the transfer acknowledging input terminal RI rises to "1". Therefore, transfer of a pulse is held from the RS flip-flop 200 to the RS flip-flop 300.

In addition, even if the RS flip-flop 200 is set in response to an input of a negative pulse to the pulse input terminal CI, no negative pulse is output to the node $\overline{RQ}$ if an input to the transfer acknowledging input terminal RI is "0" (inhibited state). Transfer of a pulse to the RS flip-flop 300 through the node $\overline{RQ}$ and transfer of a pulse to the pulse output terminal CO are held.

In a manner as described above, the pulse applied to the pulse input terminal CI is autonomously transferred to the pulse output terminal CO according to a state of a transfer acknowledging signal applied from the succeeding stage portion to the transfer acknowledging input terminal RI.

A structure of a transfer control circuit for use in the packet collecting circuits shown in FIGS. 1, 3 and 4 is not limited to that shown in FIG. 6 and a transfer control circuit of other structure may be used.

In addition, in the transfer control circuit of FIG. 6, "1" of a transfer control signal indicates a transfer permitted state, while "0" of a transfer acknowledging signal indicates a transfer inhibited state or a transfer verified state. "0" of a signal applied to the pulse input terminal CI indicates a transfer request. However, positive and negative of logic are not limited thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A packet collecting circuit for collecting packets asynchronously applied from a plurality of flow paths and for outputting the packets to a flow path in a succeeding stage, comprising:

a plurality of packet transferring means, each coupled to a respective one of said plurality of flow paths, for transferring data applied from a respective flow path to the flow path in the succeeding stage;

flag transferring means, coupled to one of said plurality of flow paths, for transferring a flag from a preceding stage which designates one of said plurality of flow paths; and selecting means, coupled to said flag transferring means and said plurality of packet transferring means, for enabling a selected packet transferring means to transfer a packet through said selecting means to the flow path in the succeeding stage in accordance with the flag transferred by said flag transferring means;

wherein said flag transferring means comprises:

self-synchronous type flag transfer controlling means for generating a first pulse signal indicative of a flag transfer and a first transfer acknowledging signal indicative of permission and inhibition of transfer, in response to receipt of a second transfer acknowledging signal indicative of permission and inhibition of transfer and a second pulse signal indicative of a flag transfer from a preceding stage; and flag holding means for holding and outputting the flag applied from the preceding stage in response to the first pulse signal from said flag transfer controlling means; and wherein each of said plurality of packet transferring means includes self-synchronous type first transfer controlling means for generating a respective third pulse signal indicative of a packet transfer and a respective third transfer acknowledging signal indicative of permission and inhibition of transfer, in response to a respective fourth transfer acknowledging signal indicative of permission and inhibition of transfer and a respective fourth pulse signal indicative of a packet transfer from a respective preceding stage; and first packet holding means for holding and outputting a packet applied from a respective flow path in response to the respective third pulse signal from said first transfer controlling means; and wherein the flow path of said succeeding stage includes self-synchronous type second transfer controlling means for generating a fifth pulse signal for packet transfer and the second transfer acknowledging signal indicative of permission and inhibition of transfer, in response to a fifth transfer acknowledging signal indicative of permission and inhibition of transfer and a respective third pulse signal from said plurality of packet transferring means; and second packet holding means for holding and outputting a packet applied from one of said plurality of packet transferring means in response to the fifth pulse signal from said second transfer controlling means.

2. The packet collecting circuit according to claim 1, wherein said selecting means comprises:

first selecting means for applying the second transfer acknowledging signal indicative of permission of transfer to one of the plurality of first transfer controlling means in accordance with the flag held by said flag holding means; and second selecting means for applying a packet output from one of the plurality of first packet holding means to said second packet holding means according to the flag held by said flag holding means.

3. The packet collecting circuit according to claim 3, wherein said first selecting means comprises:

decoder means for decoding the flag held by said flag holding means; and logic gate means, responsive to an output of said decoder means and the second transfer acknowledging signal from said second transfer controlling means, for applying the second transfer acknowledging signal to enable one of said plurality of first transfer controlling means to transfer a packet.

4. The packet collecting circuit according to claim 3, wherein said second selecting means comprises a data selector means responsive to the flag held by said flag holding means for selecting one of the packets applied from said plurality of first packet holding means and for applying the selecting packet to said second packet holding means.

5. The packet collecting circuit according to claim 3, wherein said second selecting means comprises:

a plurality of 3-state gate means, each coupled to a respective one of said plurality of first packet holding means and said second packet holding means, each of said plurality of 3-state gate means being responsive to an output of said decoder means to assume one of a conductive and non-conductive state.

6. The packet collecting circuit according to claim 1, wherein said flag holding means has a reset function and is reset in response to the second transfer acknowledging signal from said second transfer controlling means.

7. The packet collecting circuit according to claim 1, further comprising:

logic gate means, responsive to the third pulse signals from said plurality of first transfer controlling means and the first pulse signal from said flag transfer controlling means, for applying a pulse signal to said second transfer controlling means.

8. A method of operating a packet collecting circuit including a plurality of packet transferring means provided corresponding to a plurality of data paths for collecting packets a synchronously applied from the plurality of flow paths and for outputting the packets to a flow path in a succeeding stage, comprising the steps of:

receiving a flag which sequentially designates one of said plurality of flow paths; and selecting and enabling one of the plurality of packet transferring means to transfer a packet in accordance with the flag;

wherein each of the plurality of packet transferring means includes self-synchronous type transfer controlling means and packet holding means, responsive to a pulse signal from the transfer controlling means, for holding and outputting a packet, said step of selecting comprising:

applying a transfer acknowledging signal indicative of permission of transfer to one of the plurality of transfer controlling means in accordance with the flag; and applying a packet output from one of the plurality of packet holding means to the flow path of the succeeding stage in accordance with the flag.

9. A packet collecting apparatus of a data-flow type system comprising:

a plurality of first packet transferring means, each coupled to a respective data flow path from a preceding stage of the dataflow type system, for holding and transferring a packet from a data flow path of the preceding stage;

second packet transferring means for holding and transferring a packet transferred from one of said plurality of first packet transferring means to a data flow path of a succeeding stage;

flag transferring means, coupled to a flag flow path from the preceding stage, for holding a flag supplied from the preceding stage, the flag designating one of said plurality of first packet transferring means for packet transfer to the succeeding stage; and selection means, coupled between said plurality of first packet transferring means and said second packet transferring means, for enabling one of said plurality of first packet transferring means for packet transfer and for delivering a packet transferred from the one of said plurality of first packet transferring means to said second packet transferring means in accordance with the flag transferred from said flag transferring means;

wherein said flag transferring means comprises:

flag transfer controlling means for generating and outputting a first pulse signal to the second packet transferring means indicative of a flag transfer and a first transfer acknowledging signal to the preceding stage indicative of permission and inhibition of a flag transfer, in accordance with receipt of a second transfer acknowledging signal from said second packet transferring means indicative of permission and inhibition of flag transfer and a pulse signal from a preceding stage indicative of flag transfer; and flag holding means for holding and outputting the flag applied from the preceding stage to said selection means in response to receipt of the first pulse signal.

10. The packet collecting apparatus of claim 9, wherein each of said plurality of first packet transferring means comprises:

first transfer controlling means for generating and outputting a respective third pulse signal to said second packet transferring means indicative of packet transfer and a respective third transfer acknowledging signal to the preceding stage indicative of permission and inhibition of packet transfer, in accordance with receipt of the second transfer acknowledging signal from said second packet transferring means indicative of permission and inhibition of packet transfer and a second pulse signal indicative of packet transfer from the preceding stage; and first packet holding means for holding and outputting the packet applied from the preceding stage in response to the respective third pulse signal from said first transfer controlling means.

11. The packet collecting apparatus of claim 10, wherein said second packet transferring means comprises:

second transfer controlling means for generating and outputting a fifth pulse signal to the succeeding stage indicative of packet transfer and the second transfer acknowledging signal indicative of permission and inhibition of packet transfer, in accordance with receipt of a fifth transfer acknowledging signal from the succeeding stage indicative of permission and inhibition of packet transfer and a respective third pulse signal from said plurality of first packet transferring means; and second packet holding means for holding and outputting the packet applied from one of said plurality of second packet transferring means in response to the fifth pulse signal from said second transfer controlling means.

12. The packet collecting apparatus of claim 11, wherein said flag transfer controlling means, said plurality of first transfer controlling means and said second transfer controlling means each comprise self-synchronous transfer controlling means.

13. The packet collecting apparatus of claim 11, wherein said selection means comprises:

first selecting means for applying the second transfer acknowledging signal indicative of permission of packet transfer to one of the plurality of first transfer controlling means in accordance with the flag held by said flag holding means; and second selecting means for applying a packet output from one of the plurality of first packet holding means to said second packet holding means according to the flag held by said flag holding means.

14. The packet collecting apparatus of claim 13, wherein said first selecting means comprises:

decoder means for decoding the flag held by said flag holding means; and logic gate means, responsive to an output of said decoder means and the second transfer acknowledging signal from said second transfer controlling means for applying the second transfer acknowledging signal to enable one of said plurality of first transfer controlling means to transfer a packet.

15. The packet collecting apparatus of claim 14, wherein said second selecting means comprises data selector means responsive to the flag held by said flag holding means for selecting one of the packets applied from said plurality of first packet holding means and for applying the selected packet to said second packet holding means.

16. The packet collecting apparatus of claim 14, wherein said second selecting means comprises:

a plurality of 3-state gate means, each coupled to a respective one of said plurality of first packet holding means and said second packet holding means, each of said plurality of 3-state gate means being responsive to an output of said decoder means to assume one of a conductive and non-conductive state.

17. The packet collecting apparatus of claim 11, wherein said flag holding means has a reset function and is reset in response to the second transfer acknowledging signal from said second transfer controlling means.

18. The packet collecting apparatus of claim 11, further comprising:

logic gate means, responsive to the third pulse signals from said plurality of first transfer controlling means and the first pulse signal from said flag transfer controlling means, for applying a pulse signal to said second transfer controlling means.

19. The packet collecting apparatus of claim 9, wherein said plurality of first packet transferring means, said second packet transferring means and said flag transferring means are self-synchronous.

20. A packet collecting circuit for collecting data packets asynchronously applied from a plurality of data flow paths and for outputting the data packets as an output data packet train to a single data flow path in a succeeding stage in an order determined by flags sequentially received at a single input terminal, comprising:

a plurality of data packet transferring means, each coupled to a respective one of said plurality of data flow paths, for transferring data applied from a respective data flow path to said single flow path in the succeeding stage;

flag transferring means, coupled to said single input terminal, for sequentially transferring flags from a preceding stage so as to order the data packets in said output packet train; and selecting means, coupled to said flag transferring means and said plurality of data packet transferring means, for enabling a selected data packet transferring means to transfer a data packet through said selecting means to the flow path in the succeeding stage in accordance with the flag transferred by said flag transferring means.

21. An interleave processing device comprising:

a plurality of processing means, each for performing predetermined processing;

data packet distributing means for distributing a plurality of data packets to said plurality of processing means; and data packet collecting means for collecting data packets asynchronously applied from said plurality of processing means and for outputting the data packets in a prescribed order to a single data flow path in a succeeding stage, said data packet collecting means including
- a plurality of data packet transferring means, each coupled to a respective one of said plurality of processing means, for sequentially transferring a data packet applied from a respective processing means to said single data flow path in the succeeding stage,
- flag transferring means, coupled to a flag flow path from a preceding stage, for sequentially transferring flags received from the preceding stage, each of said flags designating one of said plurality of processing means, and
- selecting means, coupled to said flag transferring means and said plurality of packet transferring means, for enabling a selected packet transferring means to transfer a packet through said selecting means to said single flow path in the succeeding stage in accordance with the flag transferred by said flag transferring means.

22. A data packet collecting apparatus of a data-flow type system comprising:
- a plurality of first data packet transferring means, each coupled to a respective data flow path of a preceding stage of the data-flow type system and for holding and transferring a data packet from said respective data flow path;
- second data packet transferring means for holding and transferring a data packet transferred from one of said plurality of first packet transferring means to a single data flow path of a succeeding stage;
- flag transferring means, coupled to a flag flow path from the preceding stage, for holding a flag supplied from said preceding stage, the flag designating one of said plurality of first data packet transferring means for transferring a packet to the succeeding stage; and
- selection means, coupled between said plurality of first data packet transferring means and said second data packet transferring means, for enabling one of said plurality of first data packet transferring means to transfer a data packet and for delivering said transferred data packet to said second data packet transferring means in accordance with the flag transferred from said flag transferring means.

* * * * *